A. J. A. DEPERDUSSIN.
AEROPLANE FUSELAGE.
APPLICATION FILED APR. 22, 1913.

1,106,193.

Patented Aug. 4, 1914.
2 SHEETS—SHEET 1.

WITNESSES

INVENTOR
ARMAND JEAN AUGUSTE DEPERDUSSIN
BY
ATTORNEYS

A. J. A. DEPERDUSSIN.
AEROPLANE FUSELAGE.
APPLICATION FILED APR. 22, 1913.

1,106,193.

Patented Aug. 4, 1914.
2 SHEETS—SHEET 2.

WITNESSES

INVENTOR
ARMAND JEAN AUGUSTE DEPERDUSSIN
BY
ATTORNEYS

UNITED STATES PATENT OFFICE.

ARMAND JEAN AUGUSTE DEPERDUSSIN, OF PARIS, FRANCE.

AEROPLANE-FUSELAGE.

1,106,193.  Specification of Letters Patent.  Patented Aug. 4, 1914.

Application filed April 22, 1913. Serial No. 762,787.

*To all whom it may concern:*

Be it known that I, ARMAND JEAN AUGUSTE DEPERDUSSIN, a citizen of the Republic of France, and a resident of 19 Rue des Entrepreneurs, Paris, France, have invented a new and useful Aeroplane-Fuselage, of which the following is a specification.

This invention relates to an aeroplane fuselage constituted entirely by the juxtaposition and cohesion, at crossed directions, of very thin slats of small width of wood, cardboard, paper or the like. The fuselage obtained in this way, while being very light, is endowed with extraordinary rigidity and solidity.

Figure 1:
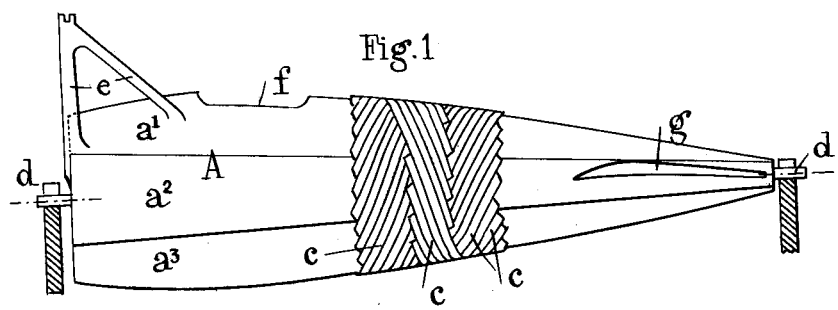
Figure 2:
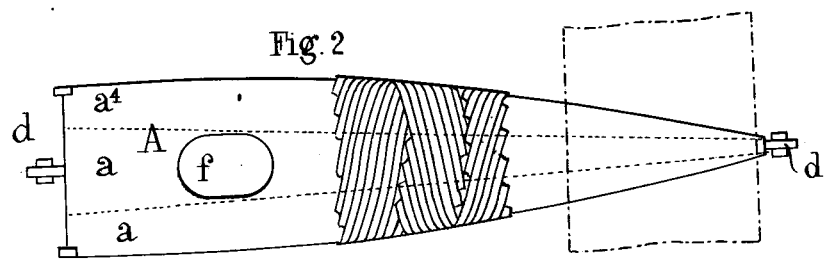
Figure 3:
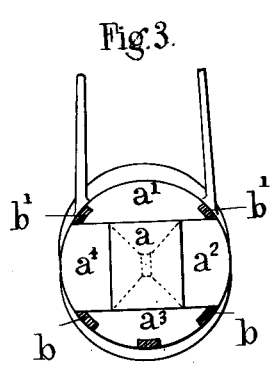
Figure 5:
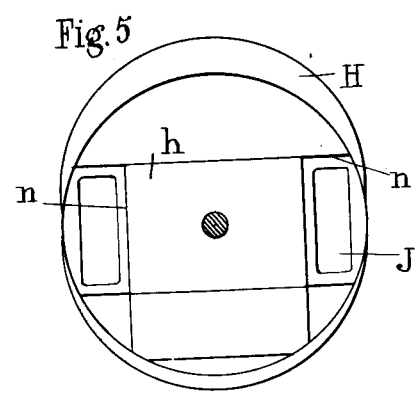
Figure 4:
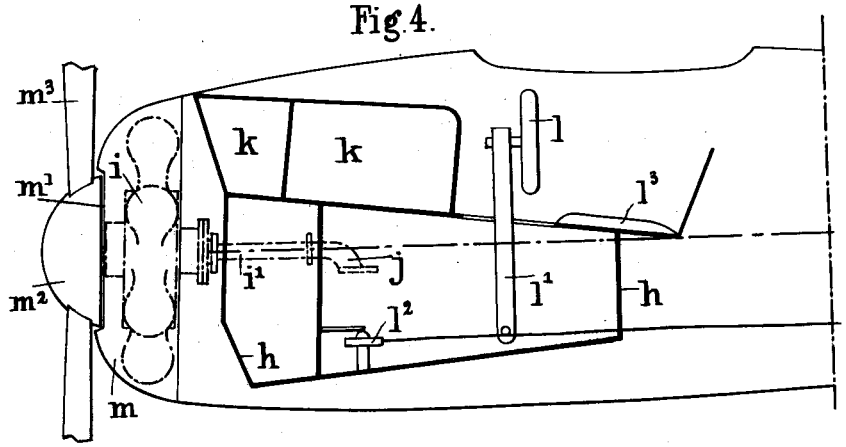
Figure 6:
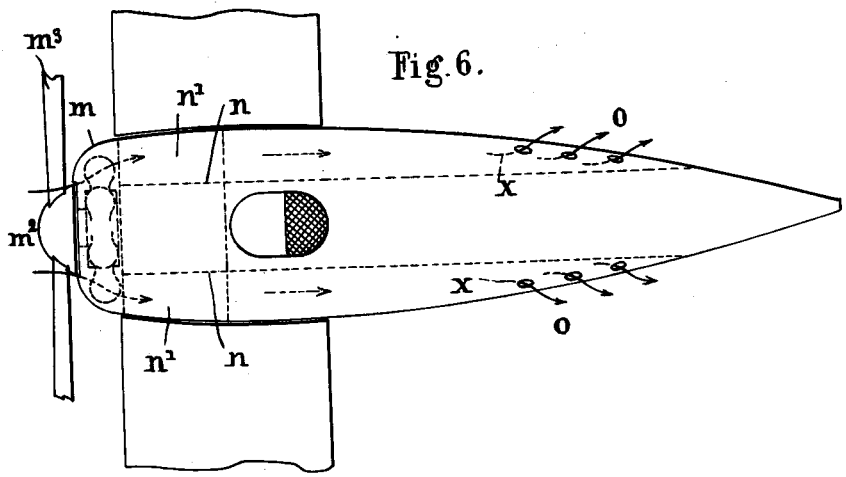

A form of construction of the object of the invention is represented by way of example upon the annexed drawing which shows:

Figure 1 an elevation of a fuselage in course of construction; in this figure there is represented only a portion of the wooden slats which are broken away to show the crossed directions of the different layers. Fig. 2 is a plan view corresponding to Fig. 1. Fig. 3 is an end view from the left of Fig. 1. Fig. 4 represents on a larger scale a longitudinal axial section of the front part of the finished fuselage and in which there has been placed the frame which supports the different propelling and controlling devices. Fig. 5 shows the end view of the apparatus after fixing the frame and the engine being supposed removed. Fig. 6 is a plan view of the finished fuselage.

The construction of the fuselage is effected upon a mold or former A composed of several parts with a view to allowing removal when the fuselage is finished. In the example represented, this former is composed of a central part $a$ of pyramidal shape upon which are fixed by any suitable means cheeks $a^1$ $a^2$ $a^3$ and $a^4$. These cheeks are provided with grooves $b^1$ to allow of accommodating the ribs $b$ of the fuselage upon which are to be nailed the wooden slats $c$ which form the fuselage body. The former is mounted preferably upon trunnions $d$ which allow of revolving it around its axis during the construction of the fuselage. First therefore the different parts of the former are assembled, after which the ribs $b$ upon which the uprights $e$ for the shrouds may even be fixed in advance are placed in position in the grooves $b^1$ of the cheeks $a^1$ $a^2$ $a^3$ $a^4$. Then the position of the openings to be formed in the fuselage is determined: the pilot's manhole $f$, openings $g$ for the accommodation of the rear empennage, etc. The wooden slats $c$ are next affixed, which operation is effected in the following manner: These slats are nailed one beside another upon the ribs $b$, in this way forming a first layer upon which is applied and glued or affixed a second layer at a crossed direction and if necessary a third and a fourth. This work is greatly facilitated by the fact that the former can be revolved around its axis. Moreover it is advantageous to affix the wooden slats under tension; for this purpose when the slat is soaked or coated with glue and fixed to a rib $b$ at one end, an energetic pull is exerted upon the other end by means of any suitable device, for example by fixing this end in a vise or tongs and exerting a pull upon the tongs by means of a tackle. It is evident that care be taken not to place the slats where openings have to be arranged. When the fastening of the slats is completed, the former is taken apart and removed; the fuselage can then be clothed externally and varnished. In this way there is obtained a monoblock or one-piece fuselage, which is very strong and very light and offers very little resistance to the air.

In a fuselage of this kind, it would be very difficult to proceed to fit the different propelling and controlling devices in the interior of the fuselage itself, as is done usually in other apparatus. There is available indeed only a space of very limited dimensions, so that fitting would be very long and troublesome to perform and moreover difficult to verify. The present invention has for object to avoid these disadvantages; it consists in mounting the whole or a part of the apparatus intended for the propulsion and the control of the apparatus upon an independent frame which is then introduced into the fuselage and secured upon the fuselage by means of any suitable device. In this way the fitting may be carried on upon an erecting table for example, which allows of avoiding any loss of time and lends itself readily to verifications. The frame upon which the different parts are mounted in this way, when secured in the interior of the fuselage, forms to some extent a partition or bulkhead in the fuselage and thereby increases rigidity. This partitioning may even be used to conduct toward the rear of the apparatus the burnt gases exhausted from the engine.

Fig. 4 is an axial section of the front part of the aeroplane showing the disposition of the frame h upon which are previously mounted the engine i and its shaft $i^1$, the carbureter j, the tanks k, as well as the controlling devices, viz. the wheel l and bridge $l^1$, foot-rail $l^2$, seat $l^3$, etc. After having received all these parts, the frame is introduced into the fuselage, in the interior of which it is fixed by any suitable means.

The fuselage when finished is provided at front with a bonnet m which incloses the engine. This bonnet has an opening $m^1$ in which is engaged the cap-shaped hub $m^2$ with which the propeller $m^3$ is provided. The opening $m^1$ is larger than the hub $m^2$ so as to leave an annular space through which the air serving for the cooling of the motor can penetrate.

Fig. 6 is a plan view of the finished fuselage showing the sub-division of the fuselage to allow the evacuation of the cooling air and the burnt gases. In this figure the frame A has been supposed to be provided upon its faces with tight-fitting walls n (see also Fig. 5) extending longitudinally so as to isolate completely the pilot's room from the space which contains the engine. There are formed in this way chambers or compartments $n^1$, which are bounded externally by the walls of the fuselage, in free communication with the space inclosing the engine and extending on either side of the apparatus. By forming in the shell at the rear of the planes suitable openings o there are constituted channels which allow the cooling air and the burnt gases to escape as indicated by the arrows x. The rear portion of the shell might even be used for the evacuation of these gases which would in this way take place at the rear of the apparatus.

What I claim and desire to secure by Letters Patent of the United States is:

1. A monoblock fuselage or body for aeroplanes, comprising a hollow frame formed of a plurality of superposed layers glued together, each layer consisting of thin plates, the plates of one layer crossing the plates of another layer.

2. A monoblock fuselage or body for aeroplanes comprising a hollow body formed of a plurality of superposed layers glued together each layer consisting of thin and narrow juxtaposed plates, the plates of one layer extending in a different direction to the plates of another layer, the frame being provided with apertures in its sides.

3. A monoblock fuselage or body for an aeroplane, comprising a hollow frame formed of superposed layers, each layer consisting of thin and narrow juxtaposed plates, the plates of one layer crossing the plates of another layer, the frame being provided with an upright at one end, an opening adjacent its other end and a manhole intermediate of its ends.

4. A monoblock fuselage or body for aeroplanes comprising a hollow frame open at one end and formed of a plurality of superposed layers, each consisting of thin plates, the plates of one layer crossing the plates of another layer, and a frame-work carrying the engine and its appurtenances and extending into the hollow frame.

5. A monoblock fuselage or body for aeroplanes, comprising a hollow frame open at one end and formed of a plurality of superposed layers, each layer consisting of thin and narrow juxtaposed plates, a frame work carrying an engine and its appurtenances and arranged in the frame, with the engine outside thereof, and an apertured cover for the open end of the frame and inclosing the engine.

6. A monoblock fuselage or body for aeroplanes, comprising a hollow frame open at one end and formed of a plurality of superposed layers, each layer consisting of thin juxtaposed plates, a frame work carrying an engine and its appurtenances and arranged in the hollow frame with the engine outside thereof, an apertured cover for the open end of the frame and inclosing the engine, and a propeller on the engine shaft outside of the cover.

7. A monoblock fuselage or body for aeroplanes, comprising a hollow frame formed of a plurality of superposed layers, each layer consisting of thin juxtaposed plates, the frame being provided with apertures in its sides and interior walls forming longitudinal passages for circulation of air and burnt gases.

In testimony whereof I have signed my name to this specification, in the presence of two subscribing witnesses.

ARMAND JEAN AUGUSTE DEPERDUSSIN.

Witnesses:
EDGAR MORGAN,
JACQUES VANDER LINGO.